(12) United States Patent
Hayase et al.

(10) Patent No.: US 7,738,797 B2
(45) Date of Patent: Jun. 15, 2010

(54) OPTICAL MODULE SOCKET

(75) Inventors: Yusuke Hayase, Tokyo (JP); Atsushi Ono, Tokyo (JP)

(73) Assignee: Advantest Corp., Tokyo (JP)

( * ) Notice: Subject to any disclaimer, the term of this patent is extended or adjusted under 35 U.S.C. 154(b) by 557 days.

(21) Appl. No.: 11/332,296

(22) Filed: Jan. 13, 2006

(65) Prior Publication Data

US 2006/0269296 A1 Nov. 30, 2006

Related U.S. Application Data

(63) Continuation of application No. PCT/JP2005/015878, filed on Aug. 31, 2005.

(30) Foreign Application Priority Data

Sep. 2, 2004 (JP) ............................. 2004-255166

(51) Int. Cl.
*H04B 10/04* (2006.01)

(52) U.S. Cl. ...................................... 398/201

(58) Field of Classification Search ................. 398/135, 398/116, 201; 385/90–93, 88; 250/214 A, 250/338.1
See application file for complete search history.

(56) References Cited

U.S. PATENT DOCUMENTS

| 6,386,768 B1 * | 5/2002 | Yoon et al. ..................... 385/88 |
| 6,592,269 B1 * | 7/2003 | Brophy et al. ................. 385/92 |
| 2001/0024551 A1 * | 9/2001 | Yonemura et al. ............. 385/88 |

FOREIGN PATENT DOCUMENTS

| JP | 7-30019 | 1/1995 |
| JP | 7-30133 | 1/1995 |
| JP | 7-294593 | 11/1995 |

* cited by examiner

*Primary Examiner*—Quan-Zhen Wang
(74) *Attorney, Agent, or Firm*—Muramatsu & Associates

(57) ABSTRACT

An optical module socket includes a base on which an optical module is mounted; descend/ascend means which is ascendably and descendably provided in the base and on which the optical module is mounted; holding means for holding the optical module in a predetermined state; pogopins provided in the base to connect with leads of the optical module; and positioning means of optical transmission means which are provided in the holding means and the descend/ascend means and which position, to the optical module, an optical connector to be connected to the optical module.

6 Claims, 7 Drawing Sheets

(a)

(b)

(A)

(B)

OPTICAL MODULE SOCKET

This is a continuation of International Application No. PCT/JP2005/15878 filed Aug. 31, 2005.

TECHNICAL FIELD

The present invention relates to an optical module socket, and more particularly, it relates to an optical module socket which enables satisfactory electric and optical external connections and which can control the temperature of an optical module.

BACKGROUND ART

In general, traditionally, sockets have been broadly classified into mass-produced type sockets and tester type sockets.

The mass-produced type socket is first soldered onto a substrate and then mounted with an electronic component, such that pads or the like of the substrate can be electrically connected with an external connection terminal (such as leads or solder balls) without directly soldering the external connection terminal of the electronic component to the pads of the substrate. Therefore, the mass-produced type socket has been used, for example, to mount electronic components or the like which are highly likely to be replaced.

Moreover, the tester type socket allows pads of test substrate to be electrically connected with an external connection terminal of the electronic component to be evaluated without directly soldering the external connection terminal to the pads of the test substrate when the electronic component itself is evaluated. Thus, the tester type socket has been essential for, for example, the inspection of the electronic component.

Various ideas have been made in connection with the above-mentioned sockets so that, for example, the electronic component can be easily replaced or the external connection terminal of the electronic component may not be damaged.

For example, in Japanese Patent Publication Laid-open No. H07-30019, there has been disclosed a technique of an IC socket in which a mechanism of confirming the loading of an IC is provided in an IC positioning table.

On the other hand, it has been increasingly essential to transmit a large volume of data at high speed along with the increasing volume in the data transmission. Electric wiring lines have various problems such as limits of throughput due to the length of the wiring line, an increase in power consumption, and an increase in noise such as radiation-field noise. An optical fiber transmission system has been researched and developed as effective means to solve the above problems, and is in practical use. For example, as far as communication among base stations is concerned, an increase in volume by means of optical communication has been achieved, and efforts have been made in connection with fiber to the office (FTTO) and fiber to the home (FTTH) in which optical fiber networks are provided to companies and households. Further, this system has wide range of uses, for example, in data transmission among boards of devices which transmit large volumes of data.

In the optical fiber transmission system, an optical module is used which converts an optical signal into an electric signal and vice versa. This optical module is different from a conventional electronic module which only handles electric signals, and comprises an external connection terminal which inputs and/or outputs electric signals as well as external optical signal connection means which inputs and/or outputs optical signals.

DISCLOSURE OF THE INVENTION

However, there is a problem that although the conventional sockets can accommodate electronic modules which only handle electric signals they can not accommodate optical modules which handle optical signals in addition to electric signals.

That is, it is necessary for an optical module socket not only to connect electrically well with an external connection terminal of an optical module but also to connect an optical fiber which is general optical transmission means to external optical signal connection means of the optical module with a high accuracy such as a margin of several microns or less.

The present invention has been made to solve the foregoing problem, and is particularly directed to provide an optical module socket which enables satisfactory electric and optical external connections and which can control the temperature of an optical module.

In order to achieve the above object, an optical module socket of the present invention is used for an optical module equipped with an external connection terminal which inputs/outputs electric signals and external optical signal connection means for inputting/outputting optical signals, and the optical module socket comprises: a base on which the optical module is mounted; electric connection means for connecting with the external connection terminal of the optical module; holding means for holding the external connection terminal in a state connected with the electric connection means; and positioning means of optical transmission means for guiding, to the external optical signal connection means, optical transmission means to be connected to the optical module, and positioning the optical transmission means at a predetermined position.

In this manner, the positioning means of optical transmission means guides and positions the optical transmission means (e.g., an optical connector) to be connected to the optical module, such that the optical transmission means (e.g., optical fiber body which performs optical transmission) is accurately connected with the external optical signal connection means of the optical module, resulting in improved reliability of optical communication.

Furthermore, in the configuration of the present invention, the base comprises descend/ascend means which is ascendably and descendably provided in an upwardly urged state and on which the optical module is mounted.

In this manner, when the descend/ascend means descends, the external connection terminal of the optical module is more reliably connected with the electric connection means, and electric connectivity between the external connection terminal and the electric connection means can be improved.

Furthermore, in the configuration of the present invention, the positioning means of optical transmission means are provided in the base and the holding means, and when the holding means is attached to the base, a fit hole into which the optical transmission means fits is formed.

In this manner, the optical transmission means to be connected to the optical module can be fitted into the fit hole to easily achieve positioning.

Furthermore, in the configuration of the present invention, the positioning means of optical transmission means comprise latch members which determine the position of the optical transmission means in an insertion direction.

In this manner, the optical transmission means can be reliably brought into close contact with the external optical signal connection means, and it is possible to effectively prevent such a disadvantage that the optical transmission means separates from the external optical signal connection means due to, for example, vibration.

Furthermore, in the configuration of the present invention, the base comprises positioning means for fitting into a body of the optical module and positioning the optical module.

In this manner, the optical module can be easily mounted or stored at a predetermined position, and moreover, external force by the optical transmission means such as an optical fiber can be absorbed.

Furthermore, in the configuration of the present invention, the electric connection means are pogopins.

In this manner, even when the installation of the optical module is performed a number of times, a decrease in the electric connectivity can be prevented. Moreover, owing to the stroke of the pogopin, variations in distance to the external connection terminal in a height direction can be absorbed, allowing the electric connectivity to be improved.

Furthermore, in the configuration of the present invention, there is provided temperature control means for controlling the temperature of the optical module.

In this manner, the optical module can be operated in a temperature-controlled state.

Furthermore, in the configuration of the present invention, the temperature control means is a heat release member which directly or indirectly contacts an upper surface of the optical module.

In this manner, the optical module can be operated in a cooled state.

The optical module socket of the present invention comprises the positioning means of optical transmission means, such that the optical transmission means is accurately connected with the external optical signal connection means of the optical module, thus allowing an improvement in reliability of the optical communication. Further, it comprises the descend/ascend means, such that the electric connectivity between the external connection terminal and the electric connection means can be improved. Still further, it comprises the temperature control means for controlling the temperature of the optical module, such that the optical module can be operated in a temperature-controlled state.

BRIEF DESCRIPTION OF THE DRAWINGS

FIG. 3a shows a schematic sectional view of A-A in FIG. 2a;

BEST MODE FOR CARRYING OUT THE INVENTION

Optical Module

Figure 1:
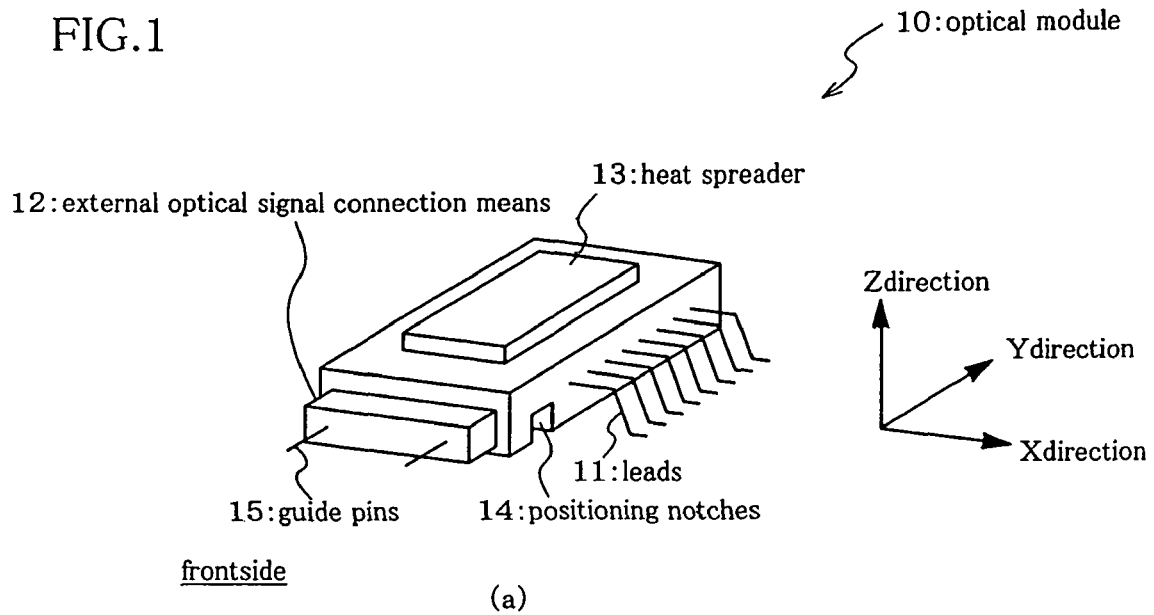
FIG. 1 is a schematic view to explain the configuration of an optical module attached to an optical module socket according to an embodiment of the present invention, wherein (a) shows an enlarged perspective view and (b) shows a plan view of the optical module.
Figure 1:
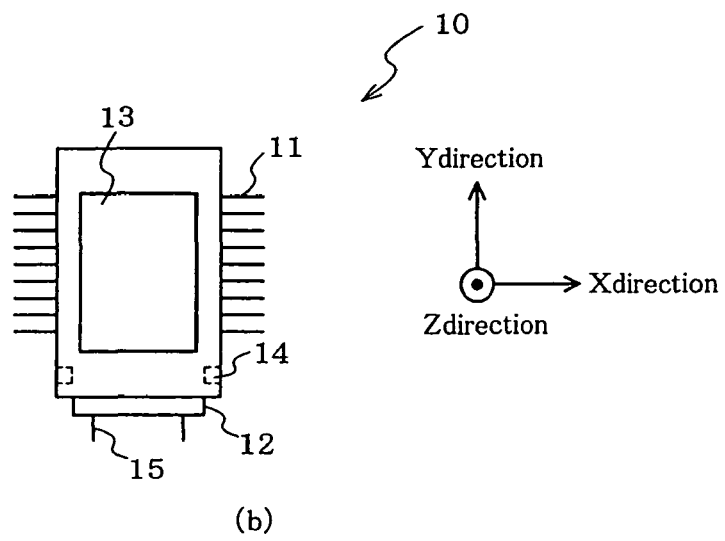

First, an optical module will be described referring to the drawings.

FIG. 1 is a schematic view to explain the configuration of an optical module attached to an optical module socket according to an embodiment of the present invention, wherein (a) shows an enlarged perspective view and (b) shows a plan view of the optical module;

In FIG. 1, an optical module 10 is an SOP type, and provided with, on both side surfaces thereof, leads 11 as an external connection terminal to input/output electric signals, and also provided with, on a front surface thereof, external optical signal connection means 12 to which an optical fiber 9 is connected and which inputs/outputs optical signals. Moreover, in the optical module 10, there are provided a heat spreader 13 on an upper surface thereof, and positioning notches 14 oppositely formed in a front-side lower surface thereof.

This optical module 10 generally converts an optical signal input by the external optical signal connection means 12 into an electric signal and outputs it from the leads 11, and/or converts an electric signal input from the leads 11 into an optical signal and outputs it from the external optical signal connection means 12.

The positioning notches 14 of the optical module 10 fit into positioning convex portions 45 as positioning means of the optical module 10 protrusively provided in descend/ascend means 4.

It is to be noted that the positioning means of the optical module is not limited to the configuration described above, and can be positioning means using a rectangular plate-like outer shape (e.g., four corners) when the optical module is a BGA type.

On the other hand, a several-micron-level quality of contact with the optical fiber 9 is required in a front-side end face of the external optical signal connection means 12 of the optical module 10. Thus, a pair of guide pins 15 are protrusively provided substantially on both sides of the external optical signal connection means 12, and these guide pins 15 are fitted into positioning holes formed in an optical connector 90 and position the optical connector 90.

[Optical Module Socket]

Figure 2A:
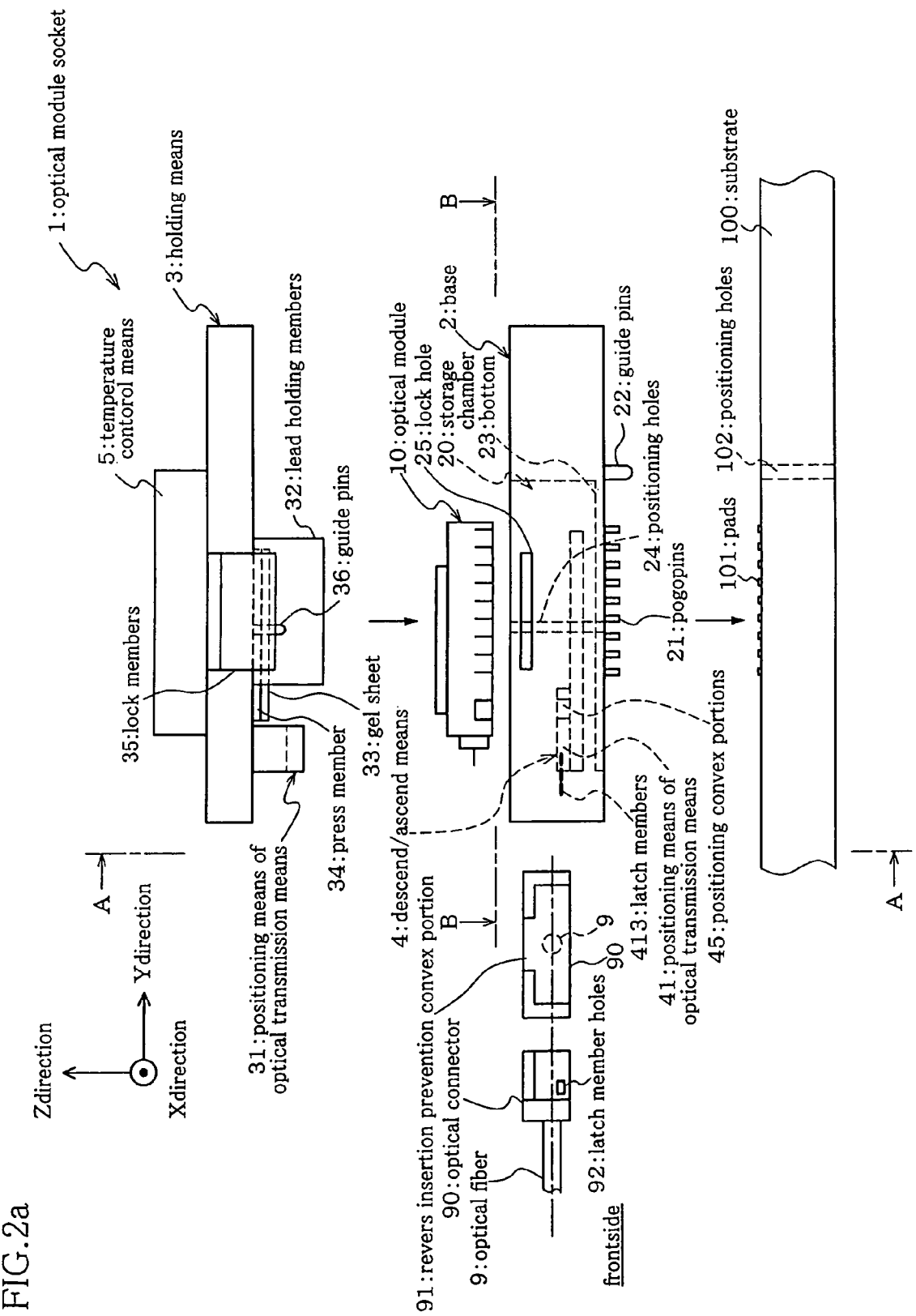
FIG. 2a shows a schematic exploded view of essential parts from a lateral direction to explain the configuration and attachment state of the optical module socket according to the embodiment of the present invention.

FIG. 2a shows a schematic exploded view of essential parts from a lateral direction to explain the configuration and attachment state of the optical module socket according to the embodiment of the present invention.

Figure 2B:
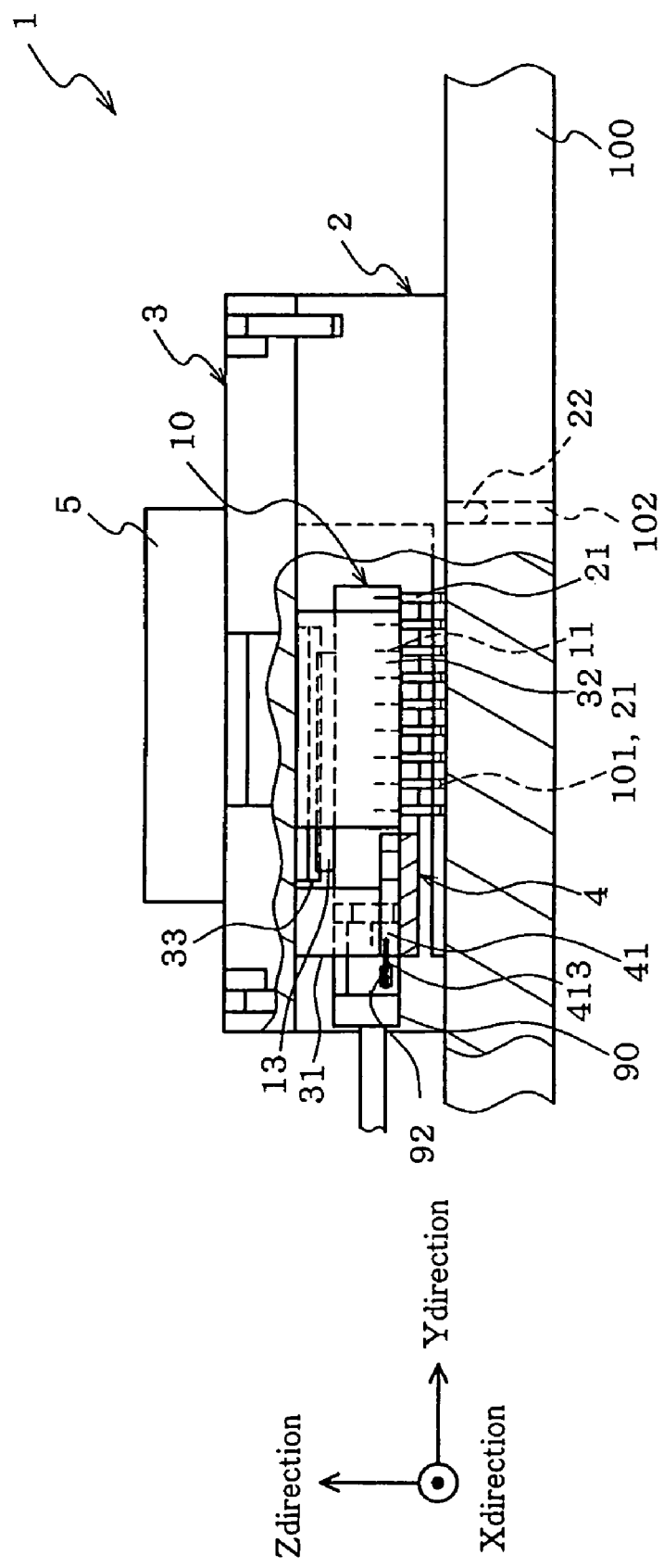
FIG. 2b shows a schematic side view of essential parts to explain how the optical module socket according to the embodiment of the present invention is used.

Furthermore, FIG. 2b shows a schematic side view of essential parts to explain how the optical module socket according to the embodiment of the present invention is used.

Figure 3A:
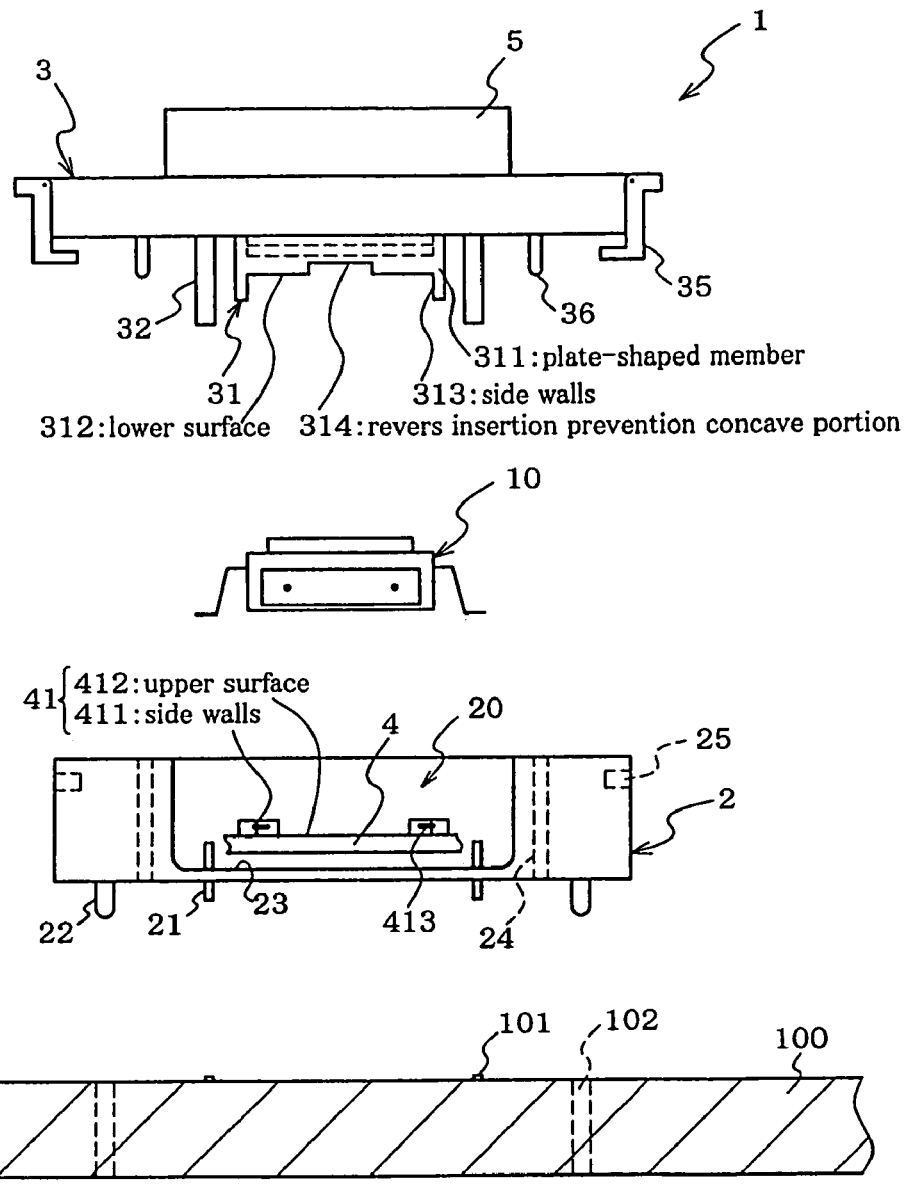

FIG. 3a shows a schematic sectional view of A-A in FIG. 2a.

Figure 3B:
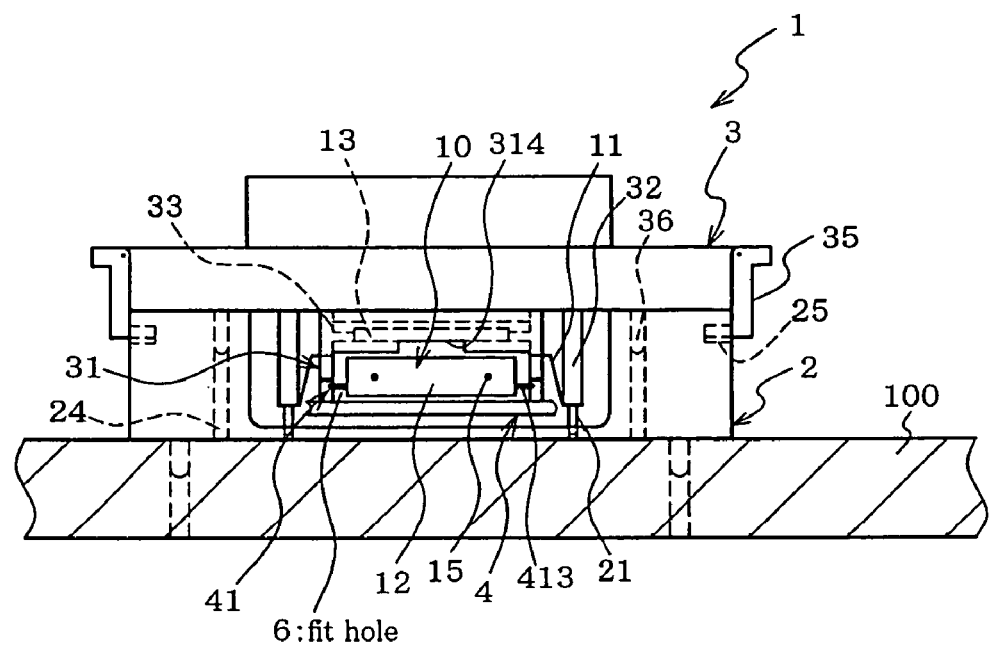
FIG. 3b shows a schematic front view of essential parts to explain how the optical module socket according to the embodiment of the present invention is used.

Furthermore, FIG. 3b shows a schematic front view of essential parts to explain how the optical module socket according to the embodiment of the present invention is used.

Figure 4A:
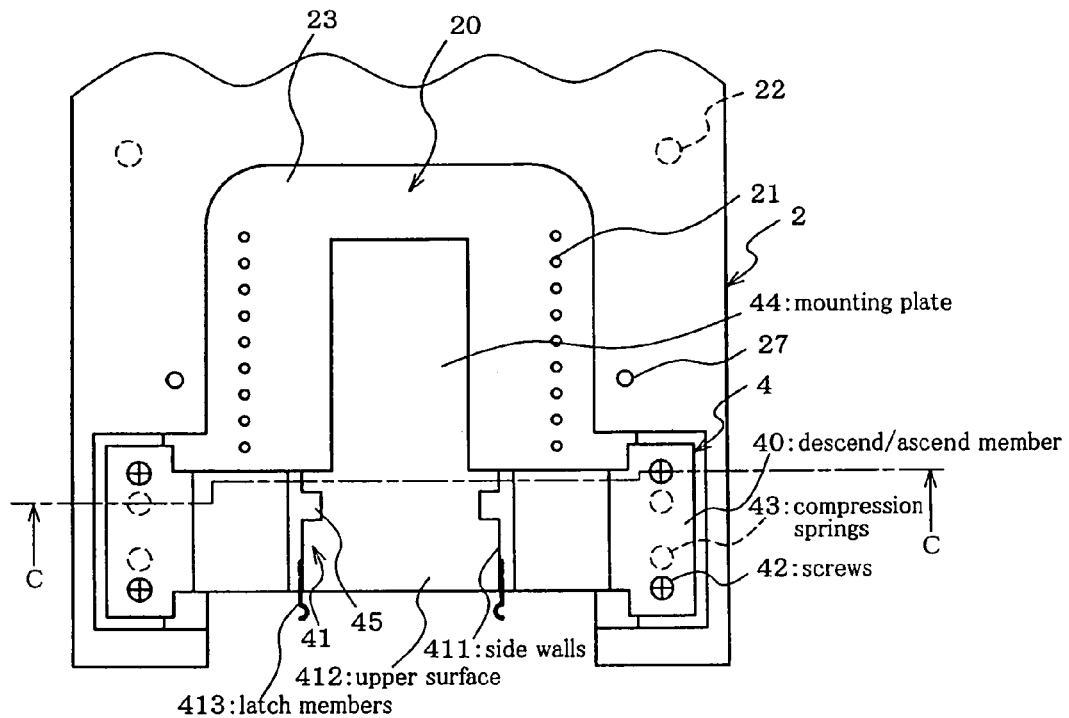
FIG. 4a includes (A) showing a schematic enlarged view indicated by arrows B-B in FIG. 2a, and (B) showing a schematic enlarged sectional view of C-C.
Figure 4A:
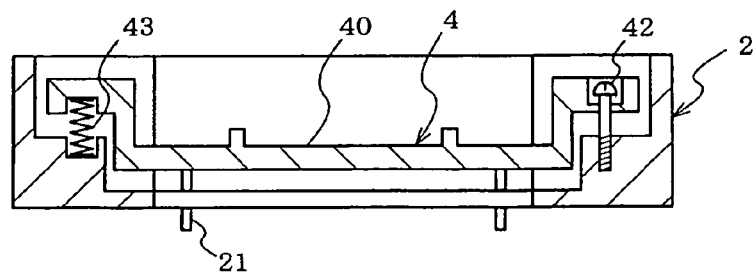

FIG. 4a includes (A) showing a schematic enlarged view indicated by arrows B-B in FIG. 2a, and (B) showing a schematic enlarged sectional view of C-C.

Figure 4B:
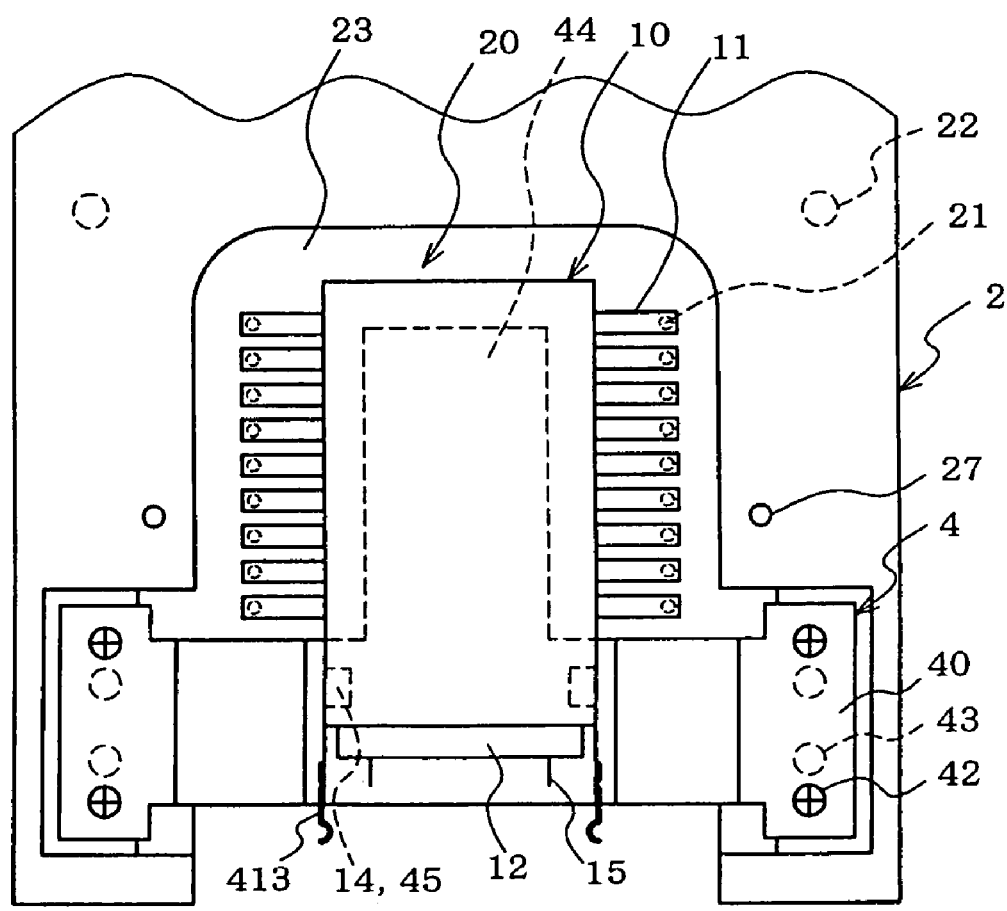
FIG. 4b shows a schematic enlarged upper surface view of essential parts to explain the state of the optical module socket according to the embodiment of the present invention wherein the optical module is mounted on descend/ascend means.

Furthermore, FIG. 4b shows a schematic enlarged upper surface view of essential parts to explain the state of the optical module socket according to the embodiment of the present invention wherein the optical module is mounted on the descend/ascend means.

In FIGS. 2a, 2b, 3a, 3b, 4a and 4b, an optical module socket 1 comprises: a base 2 on which the optical module 10 is mounted; the descend/ascend means 4 ascendably and descendably provided in the base 2 and on which the optical module 10 is mounted; holding means 3 for holding the optical module 10 in a predetermined state; pogopins 21 provided in the base 2 to connect with the leads 11 of the optical module 10; and positioning means of optical transmission means 31, 41 for guiding, to the optical module 10, the optical connector 90 to be connected to the optical module 10 and positioning the optical connector 90.

It is to be noted that the optical fiber 9 as optical transmission means of the present embodiment is provided with the female optical connector 90 at its tip, as shown in FIG. 2a. In this optical connector 90, a reverse insertion prevention convex portion 91 is provided on a tip-side upper part thereof, and a latch member holes 92 are formed in a lateral center portion thereof.

(Base)

The base 2 of the optical module socket 1 has a substantially rectangular plate-like shape, and in its center, there is formed a storage chamber 20 opening on a front side to store the optical module 10. On a bottom 23 of this storage chamber 20, there are provided the pogopins 21 as electric connection means at positions corresponding to the leads 11 of the optical module 10 mounted on the descend/ascend means 4. The pogopins 21 protrude upward from an upper surface of the bottom 23 so that upper ends thereof contact the leads 11. Moreover, the pogopins 21 have lower ends thereof protruding downward from a lower surface of the bottom 23 and contacting pads 101 of a substrate 100, thereby electrically connecting the leads 11 of the optical module 10 with the pads 101 of the substrate 100. Thus, the use of the pogopins 21 as the electric connection means can prevent a decrease in electric connectivity even if the installation of the optical module 10 is performed a number of times. Further, owing to the stroke of the pogopins 21, variations in distance to the leads 11 in a height direction can be absorbed, allowing an improvement in the electric connectivity.

The base 2 is provided with, on a lower surface thereof, a pair of guide pins 22 to be fitted into positioning holes 102 of the substrate 100. Since the pair of guide pins 22 are fitted into the positioning holes 102, the substrate 100 can be easily positioned at a predetermined position. Further, in the configuration of the present embodiment, the base 2 is mounted on the substrate 100, it is not limited to this particular configuration, and it is also possible to have a configuration in which the base 2 is fixed to the substrate 100 by use of, for example, screws and nuts.

In an upper surface of the base 2, positioning holes 24 are bored into which a pair of guide pins 36 of the holding means 3 are fitted. Since the pair of guide pins 36 are fitted into the positioning holes 24, the holding means 3 can be easily positioned at a predetermined position in the base 2.

Moreover, substantially in the center of both side surfaces of the base 2, lock holes 25 are formed into which lock members 35 of the holding means 3 are locked.

(Descend/Ascend Means)

As shown in FIG. 4a, the descend/ascend means 4 of the optical module socket 1 comprises a descend/ascend member 40 made of a substantially rectangular plate material, and a mounting plate 44 extending from the center of the descend/ascend member 40 in a Y direction on which a body of the optical module 10 is mounted. This descend/ascend member 40 is urged upward at both ends thereof by compression springs 43, and supported movably in a vertical direction by bodies of screws 42 provided at four corners. It is to be noted that in the configuration of the present embodiment, the descend/ascend member 40 is molded integrally with the mounting plate 44, it is not limited to this particular configuration, and it is also possible to have a configuration in which the descend/ascend member 40 and the mounting plate 44 which are separately molded are coupled by, for example, screws.

In the center of this descend/ascend member 40, there is protrusively provided oppositely to each other, the pair of positioning convex portions 45 as positioning means of the optical module 10 which are formed in the body of the optical module 10 and which fit into the positioning notches 14. Thus, the optical module 10 can be easily mounted at a predetermined position in the descend/ascend means 4, and the leads 11 of the optical module 10 can be accurately connected with the pogopins 21. Moreover, the positioning convex portions 45 can absorb external force from the optical fiber 9, and prevent, for example, unnecessary external force from acting on the leads 11.

(Holding Means)

The holding means 3 has a planar plate shape, and has the guide pins 36 protrusively provided to correspond to the pair of positioning holes 24 bored in the upper surface of the base 2, which allows positioning in the X and Y directions with respect to the base 2.

Furthermore, the holding means 3 is protrusively provided with a pair of substantially planar-plate-shaped lead holding members 32 which press the leads 11 of the optical module 10 against the pogopins 21 for connection.

Moreover, the holding means 3 is provided with the lock members 35 which are locked into the lock holes 25 of the base 2, positions the holding means 3 in a Z direction, and locks the holding means 3 to the base 2. In addition, in the present embodiment, the holding means 3 is locked to the base 2, such that the lead holding members 32 press down the leads 11 and hold the leads 11 in a state connected with the pogopins 21.

The holding means 3 is provided with a press member 34 which contacts the heat spreader 13 of the optical module 10 via a gel sheet 33 having good heat transmission properties. In addition, for the holding means 3, a metal having good heat transmission properties such as aluminum is generally used, thereby allowing the optical module 10 to be efficiently cooled off.

(Positioning Means of Optical Transmission Means)

The positioning means of optical transmission means 31, 41 are provided in the holding means 3 and the descend/ascend means 4, respectively.

As shown in FIG. 3a, the positioning means of optical transmission means 31 comprises a lower surface 312 of a plate-shaped member 311 protrusively provided on a central front-side lower surface of the holding means 3, and sidewalls 313 protrusively provided oppositely to each other at both ends of the lower surface 312.

Furthermore, the positioning means of optical transmission means 41 comprises sidewalls 411 protrusively provided oppositely to each other and an upper surface 412 of the descend/ascend member 40, and is provided on a central front side of the descend/ascend member 40.

As shown in FIG. 3b, the positioning means of optical transmission means 31, 41 form a fit hole 6 when the holding means 3 is attached to the base 2. When the optical fiber 9 is connected to the external optical signal connection means 12, the optical connector 90 is fitted into the fit hole 6, thereby guiding and easily positioning the optical connector 90.

Here, in the center of the lower surface 312 of the plate-shaped member 311, the reverse insertion prevention concave portion 314 is preferably formed into which the reverse insertion prevention convex portion 91 of the optical connector 90 is fitted. This makes it possible to effectively prevent such a disadvantage that the optical connector 90 is inserted in a wrong vertical direction when the optical connector 90 is fitted into the fit hole 6.

Furthermore, it is more preferable to have a configuration in which the positioning means of optical transmission means 41 comprises latch members 413 which determine the position of the optical connector 90 in an insertion direction (Y direction). The latch members 413 of the present embodiment are embedded in the sidewalls 411, and are stick-shaped elastic bodies whose tips are bent inward in a semicircular form, as shown in FIG. 4a. The latch members 413 has the semicircular portions fitted in the latch member holes 92 of the optical connector 90 and can determine the position of the optical connector 90 in the insertion direction.

In this manner, the optical connector 90 can be reliably brought into close contact with the external optical signal connection means 12, and it is possible to effectively prevent such a disadvantage that the optical connector 90 separates from the external optical signal connection means 12 due to, for example, vibration.

(Temperature Control Means)

The holding means 3 is provided with, on its upper surface, temperature control means 5 which controls the temperature of the optical module 10. This allows the optical module 10 to be operated in a temperature-controlled state. Further, in the configuration of the present embodiment, a heat release member (not shown) is provided as the temperature control means 5 which indirectly contacts the optical module 10. In this manner, the optical module 10 can be operated in a cooled state.

Although not shown in the drawings, cooling means using the above-mentioned heat release member may be configured, for example, in such a manner that the heat release member is provided on the upper surface of the holding means 3 via a peltier module and an air blower is provided above the heat release member. In this manner, heat of the optical module 10 is transmitted to the heat release member via the heat spreader 13, the gel sheet 33, the holding means 3 and the peltier module, and released into the atmosphere from the heat release member air-cooled by the air blower, thereby allowing improved cooling performance of the cooling means and accurate temperature control.

Next, the operation of the optical module socket 1 having the above structure will be described referring to the drawings.

In the optical module socket 1, the base 2 is first mounted on the substrate 100 so that the guide pins 22 are fitted into the positioning holes 102, and the pads 101 of the substrate 100 are connected with lower ends of the pogopins 21 (see FIG. 2b).

Next, as shown in FIG. 4b, the optical module 10 is mounted on the mounting plate 44 of the descend/ascend means 4 in such a manner that the positioning convex portions 45 are fitted in the positioning notches 14 of the optical module 10. Thus, the positioning convex portions 45 are fitted into the positioning notches 14 of the optical module 10, so that it is possible to prevent such a disadvantage that the optical module 10 is moved, and the leads 11 and the pogopins 21 are damaged even if the external force from the optical fiber 9 acts on the optical module 10. Moreover, the leads 11 are accurately positioned over the pogopins 21, such that the leads 11 can be reliably connected with the pogopins 21.

Next, the holding means 3 is mounted on the base 2 so that the guide pins 36 are fitted into the positioning holes 24, and the lock members 35 are locked into the lock holes 25 (see FIG. 3b).

At this moment, in the optical module 10 mounted on the descend/ascend means 4, the leads 11 are pressed down by the lead holding members 32 and descends to a predetermined height together with the descend/ascend means 4, resulting in a good connection between the leads 11 and the pogopins 21. Moreover, the heat spreader 13 contacts the gel sheet 33, and efficiently transmits the heat of the optical module 10 to the holding means 3. In addition, the fit hole 6 is formed by the positioning means of optical transmission means 31, 41.

Next, the optical connector 90 is connected with the external optical signal connection means 12. At this point, the tip of the optical connector 90 is first guided to be fitted into the fit hole 6, and then an optical fiber body (not shown) of the optical fiber 9 is optically connected with the external optical signal connection means 12 by the guide pins 15 of the optical module 10 in such a manner as to maintain micron-level contact quality. Here, since the optical connector 90 has been positioned by the fit hole 6, the external force destroying the contact quality can be absorbed, thus allowing a significant improvement in reliability of the optical connection between the optical connector 90 and the external optical signal connection means 12. Moreover, since the optical connector 90, when connected, is guided to the fit hole 6 before contacting the guide pins 15, it is possible to prevent such a disadvantage that the optical connector 90 is erroneously brought into contact with the guide pins 15.

Furthermore, the reverse insertion prevention concave portion 314 of the positioning means of optical transmission means 31 can effectively prevent such a disadvantage that the optical connector 90 is inserted in a wrong vertical direction when the optical connector 90 is fitted into the fit hole 6.

Moreover, the latch members 413 of the positioning means of optical transmission means 41 have the semicircular portions fitted in the latch member holes 92 of the optical connector 90 and can determine the position of the optical connector 90 in the insertion direction.

In this manner, according to the optical module socket 1, the optical fiber 9 is accurately connected with the external optical signal connection means 12 of the optical module 10, thus allowing an improvement in reliability of the optical communication. Further, the descend/ascend means 4 is provided, such that the electric connectivity between the leads 11 and the pogopins 21 can be more improved. Still further, the temperature control means 5 is provided to control the temperature of the optical module 10, such that the optical module 10 can be operated in a temperature-controlled state.

While the optical module socket of the present invention has been described above showing the preferred embodiment, the optical module socket according to the present invention is not exclusively limited to the embodiment described above, and it should be understood that various modifications can be made within the scope of the present invention.

For example, the optical module socket 1 has a configuration in which the descend/ascend means 4 is provided to absorb a dimensional error in the height direction of the leads 11, but may also have a configuration in which the optical module 10 is directly mounted on the base 2.

Furthermore, the optical module 10 is not limited to the optical module in the configuration described above, and the optical module socket according to the present invention can accommodate, for example, a BGA type optical module or optical connectors having different configurations. Moreover, the optical connector 90 is not limited to the optical connector in the configuration described above either.

Still further, the optical module socket 1 has a configuration in which it is electrically connected with the substrate 100 via the pogopins 21, and this configuration is generally used when the optical module 10 is evaluated/tested by use of the substrate 100 and the optical module socket 1. However, the optical module socket of the present invention is not limited to this configuration, and can be applied, for example, as an optical module socket used in a configuration wherein the optical module socket is soldered onto a mass-produced substrate.

The invention claimed is:

1. An optical module socket for use in an optical module equipped with leads each of which inputs/outputs electric signals and optical connectors for inputting/outputting optical signals, the optical module socket comprising:
  a base on which the optical module is mounted;
  pogopins formed on the base for electrical connection by elastic movements in an upward/downward direction;
  holding means for holding the leads of the optical module in a state connected with the pogopins;
  optical transmission means for transmitting optical signals therethrough;
  positioning means for guiding the optical transmission means to the optical connectors so as to be connected to the optical module, and for positioning the optical transmission means at a predetermined position; and
  descend/ascend means for ascendably and descendably mounting thereon the optical module; and
  wherein the pogopins electrically connect to the leads of the optical module at one ends, and the pogopins further electrically connect, at another ends, to pads of a substrate on which the optical module socket is mounted; and
  wherein the descend/ascend means and the pogopins absorb an external force applied to the optical module while the holding means presses the leads of the optical module, thereby connecting the leads to the pogopins;
  wherein the positioning means includes a fit hole created by a lower surface of the holding means and an upper surface of the base, when the holding means is mounted on the base, for fitting the optical transmission means with the optical connectors of the optical module, and a prevention structure is formed within the fit hole for preventing reverse insertion of the optical transmission means.

2. The optical module socket according to claim 1, wherein the positioning means comprises latch members which determine the position of the optical transmission means in an insertion direction.

3. The optical module socket according to claim 1, wherein the base comprises positioning means for fitting into a body of the optical module and positioning the optical module.

4. The optical module socket according to claim 1, further comprising temperature control means for controlling the temperature of the optical module.

5. The optical module socket according to claim 4, wherein the temperature control means is a heat release member which directly or indirectly contacts an upper surface of the optical module.

6. The optical module socket according to claim 1, wherein the positioning means are provided in the base and the holding means.

* * * * *